(12) United States Patent
Sato et al.

(10) Patent No.: US 12,305,301 B2
(45) Date of Patent: May 20, 2025

(54) CARBON DIOXIDE GAS-PHASE REDUCTION DEVICE AND CARBON DIOXIDE GAS-PHASE REDUCTION METHOD

(71) Applicant: Nippon Telegraph and Telephone Corporation, Tokyo (JP)

(72) Inventors: Sayumi Sato, Musashino (JP); Yuya Uzumaki, Musashino (JP); Akihiro Kono, Musashino (JP); Takeshi Komatsu, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 16 days.

(21) Appl. No.: 18/555,415

(22) PCT Filed: May 25, 2021

(86) PCT No.: PCT/JP2021/019783
§ 371 (c)(1),
(2) Date: Oct. 13, 2023

(87) PCT Pub. No.: WO2022/249276
PCT Pub. Date: Dec. 1, 2022

(65) Prior Publication Data
US 2024/0124996 A1    Apr. 18, 2024

(51) Int. Cl.
*C25B 3/21* (2021.01)
*C25B 3/03* (2021.01)
(Continued)

(52) U.S. Cl.
CPC ............. *C25B 15/023* (2021.01); *C25B 3/03* (2021.01); *C25B 3/07* (2021.01); *C25B 3/21* (2021.01);
(Continued)

(58) Field of Classification Search
None
See application file for complete search history.

(56) References Cited

U.S. PATENT DOCUMENTS

| 2016/0010223 A1* | 1/2016 | Sato ..................... C25B 11/057 |
| | | 204/229.1 |
| 2020/0087803 A1* | 3/2020 | Kitagawa ................. C25B 9/19 |

OTHER PUBLICATIONS

Satoshi Yotsuhashi et al., $CO_2$ Conversion with Light and Water by GaN Photoelectrode, Japanese Journal of Applied Physics, vol. 51, 2012, pp. 02BP07-1-02BP07-3.

(Continued)

*Primary Examiner* — Wojciech Haske
(74) *Attorney, Agent, or Firm* — Workman Nydegger

(57) ABSTRACT

A gas phase reduction device for carbon dioxide is a gas phase reduction device for carbon dioxide that exerts a catalytic function by light irradiation to generate oxidation-reduction reaction. The gas phase reduction device includes an oxidation tank in which an aqueous solution is put, a reduction tank to which carbon dioxide is supplied, a semiconductor photoelectrode installed in the aqueous solution, and a porous electrode-supported electrolyte membrane that is a joint body of an electrolyte membrane and a porous reduction electrode, the porous electrode-supported electrolyte membrane being installed between the oxidation tank and the reduction tank with the electrolyte membrane facing the oxidation tank and the porous reduction electrode facing the reduction tank. Voltage between a reference electrode installed in the aqueous solution and a reference electrode installed in contact with the electrolyte membrane is measured by a voltmeter, and a control unit increases voltage between the semiconductor photoelectrode and the porous reduction electrode in accordance with change in voltage between the reference electrodes from an initial value at start of reaction. The control unit includes a solar cell and a (Continued)

constant voltage power supply, and the solar cell is arranged on an extension line of a straight line from a light source toward the semiconductor photoelectrode, and generates power utilizing light emitted to and transmitted through the semiconductor photoelectrode.

4 Claims, 4 Drawing Sheets

(51) Int. Cl.
*C25B 3/07* (2021.01)
*C25B 3/26* (2021.01)
*C25B 9/19* (2021.01)
*C25B 9/50* (2021.01)
*C25B 11/049* (2021.01)
*C25B 15/023* (2021.01)

(52) U.S. Cl.
CPC ............... *C25B 3/26* (2021.01); *C25B 9/19* (2021.01); *C25B 9/50* (2021.01); *C25B 11/049* (2021.01)

(56) References Cited

OTHER PUBLICATIONS

Yoshi Hori et al., *Formation of Hydrocarbons in the Electrochemical Reduction of Carbon Dioxide at a Copper Electrode in Aqueous Solution*, Journal of the Chemical Society, vol. 85, No. 8, 1989, pp. 2309-2326.

Qingxin Jia et al., *Direct Gas-phase $CO_2$ reduction for Solar Methane Generation Using a Gas Diffusion Electrode with a $BiVO_4$:Mo and a Cu—In—Se Photoanode*, Chemistry Letters, vol. 47, No. 4, 2018, pp. 436-439.

\* cited by examiner

CARBON DIOXIDE GAS-PHASE REDUCTION DEVICE AND CARBON DIOXIDE GAS-PHASE REDUCTION METHOD

TECHNICAL FIELD

The present invention relates to a gas phase reduction device for carbon dioxide and a gas phase reduction method for carbon dioxide.

BACKGROUND ART

Artificial photosynthesis technology using sunlight and electrolytic reduction technology using electric power derived from renewable energy have attracted attention as technology that enables recycling carbon dioxide into hydrocarbons of carbon monoxide, formic acid, ethylene, and the like and alcohols of methanol, ethanol, and the like, and have been actively studied in recent years.

In artificial photosynthesis technology and carbon dioxide electrolytic reduction technology, a reaction system has been used in which a reduction electrode is immersed in an aqueous solution, and carbon dioxide dissolved in the aqueous solution is supplied to the reduction electrode and reduced (see Non Patent Literatures 1 and 2). However, in this method of reducing carbon dioxide, there is a limit to the concentration of carbon dioxide dissolved in an aqueous solution and the diffusion coefficient of carbon dioxide in the aqueous solution, which limits the amount of carbon dioxide supplied to a reduction electrode.

In view of this issue, research on supplying carbon dioxide in a gas phase to a reduction electrode has been advanced in order to increase the amount of carbon dioxide supplied to the reduction electrode. According to Non Patent Literature 3, by using a reactor having structure capable of supplying carbon dioxide in a gas phase to a reduction electrode, the amount of carbon dioxide supplied to the reduction electrode is increased, and reduction reaction of carbon dioxide is promoted.

CITATION LIST

Non Patent Literature

Non Patent Literature 1: Satoshi Yotsuhashi, and 6 others "CO2 Conversion with Light and Water by GaN Photoelectrode", Japanese Journal of Applied Physics, 51, 2012, p. 02BP07-1-p. 02BP07-3

Non Patent Literature 2: Yoshio Hori, and 2 others "Formation of Hydrocarbons in the Electrochemical Reduction of Carbone Dioxide at a Copper Electrode in Aqueous Solution", Journal of the Chemical Society, 85(8), 1989, p. 2309-p. 2326

Non Patent Literature 3: Qingxin Jia, and 2 others "Direct Gas-phase CO2 Reduction for Solar Methane Generation Using a Gas Diffusion Electrode with a BiVO4:Mo and a Cu—In—Se Photoanode", Chemistry Letter, 47, 2018, p. 436-439

SUMMARY OF INVENTION

Technical Problem

In a gas phase reduction reaction device for carbon dioxide, an aqueous solution in a reduction tank is removed and carbon dioxide in a gas phase is charged, but protons ($H^+$) cannot move in the gas phase if carbon dioxide in the gas phase is just charged. Therefore, an electrolyte membrane in which a porous reduction electrode is joined is installed between an oxidation tank and the reduction tank so that carbon dioxide in the gas phase can reach the interface between the reduction electrode and the electrolyte membrane.

When a semiconductor photoelectrode installed on the counter electrode of the reduction electrode is irradiated with light, electrons and holes are generated and separated. In the semiconductor photoelectrode, oxidation reaction of water indicated by Formula (1) proceeds. In the reduction electrode, gas phase reduction reaction of carbon dioxide indicated by Formula (2) to Formula (5) and hydrogen generation reaction indicated by Formula (6) proceed as side reaction.

$$2H_2O + 4h^+ \rightarrow O_2 + 4H^+ \tag{1}$$

$$CO_2 + 2H^+ + 2e^- \rightarrow CO + H_2O \tag{2}$$

$$CO_2 + 2H^+ + 2e^- \rightarrow HCOOH \tag{3}$$

$$CO_2 + 6H^+ + 6e^- \rightarrow CH_3OH + H_2O \tag{4}$$

$$CO_2 + 8H^+ + 8e^- \rightarrow CH_4 + 2H_2O \tag{5}$$

$$2H^+ + 2e^- \rightarrow H_2 \tag{6}$$

In general, since the carbon dioxide reduction reaction indicated by Formula (2) to Formula (5) is multi-electron and multi-step reaction, electromotive force higher than that for progress of the side reaction indicated by Formula (6) (1.23 V or more) is required for progress of the reduction reaction.

In order to improve proton conductivity in the aqueous solution in the oxidation tank, a strong alkaline aqueous solution having a pH=13 or more is often used as the aqueous solution. Furthermore, the gas phase reduction device for carbon dioxide is used in a configuration in which the electrolyte membrane side of the joint body of the electrolyte membrane and the reduction electrode is brought into contact with the aqueous solution (strong alkali) of the oxidation tank. Since the electrolyte membrane contains neutral water before the contact with the aqueous solution, pH=7 (neutral) at the interface between the electrolyte membrane and the reduction electrode, but when the electrolyte membrane is brought into contact with the aqueous solution and a light irradiation test is started, the strong alkaline aqueous solution in the oxidation tank diffuses into the electrolyte membrane, and the interface between the electrolyte membrane and the reduction electrode gradually changes from pH=7 to pH=13 or more. As a result, the potential of the reduction electrode for the semiconductor photoelectrode is reduced by 0.059 [V]*(change in pH) so that the electromotive force is reduced, the reduction reaction of carbon dioxide requiring a higher potential difference is suppressed, and accordingly there is an issue that a life of the reduction reaction of carbon dioxide is reduced.

The present invention has been made in view of the above, and an object thereof is to improve a life of reduction reaction of carbon dioxide.

Solution to Problem

A gas phase reduction device for carbon dioxide according to an aspect of the present invention is a gas phase reduction device for carbon dioxide that exerts a catalytic function by light irradiation to generate oxidation-reduction reaction, the gas phase reduction device for carbon dioxide including an oxidation tank in which an aqueous solution is put, a reduction tank to which carbon dioxide is supplied, a semiconductor photoelectrode installed in an aqueous solution in the oxidation tank, a porous electrode-supported electrolyte membrane that is a joint body of an electrolyte membrane and a porous reduction electrode, the porous electrode-supported electrolyte membrane being installed between the oxidation tank and the reduction tank with the electrolyte membrane facing the oxidation tank and the porous reduction electrode facing the reduction tank, a control unit that is electrically connected to the semiconductor photoelectrode and the porous reduction electrode and controls voltage between the semiconductor photoelectrode and the porous reduction electrode, a first reference electrode installed in an aqueous solution in the oxidation tank, a second reference electrode installed on the reduction tank side in contact with the electrolyte membrane, and a voltmeter that measures voltage between the first reference electrode and the second reference electrode, in which the control unit increases voltage between the semiconductor photoelectrode and the porous reduction electrode in accordance with change in voltage between the first reference electrode and the second reference electrode from an initial value at start of reaction.

A gas phase reduction method for carbon dioxide according to an aspect of the present invention is a gas phase reduction method for carbon dioxide using a gas phase reduction device for carbon dioxide including an oxidation tank in which an aqueous solution is put, a reduction tank to which carbon dioxide is supplied, a semiconductor photoelectrode installed in an aqueous solution in the oxidation tank, and a porous electrode-supported electrolyte membrane that is a joint body of an electrolyte membrane and a porous reduction electrode, the porous electrode-supported electrolyte membrane being installed between the oxidation tank and the reduction tank with the electrolyte membrane facing the oxidation tank and the porous reduction electrode facing the reduction tank, the gas phase reduction method for carbon dioxide including measuring voltage between a first reference electrode installed in an aqueous solution in the oxidation tank and a second reference electrode installed on the reduction tank side in contact with the electrolyte membrane, and increasing voltage between the semiconductor photoelectrode and the porous reduction electrode in accordance with change in voltage between the first reference electrode and the second reference electrode from an initial value at start of reaction.

Advantageous Effects of Invention

According to the present invention, a life of reduction reaction of carbon dioxide can be improved.

DESCRIPTION OF EMBODIMENTS

Hereinafter, an embodiment of the present invention will be described with reference to the drawings. The present invention is not limited to the embodiment described below, and modifications may be made without departing from the gist of the present invention.

[Configuration of Gas Phase Reduction Device for Carbon Dioxide]

Figure 1:
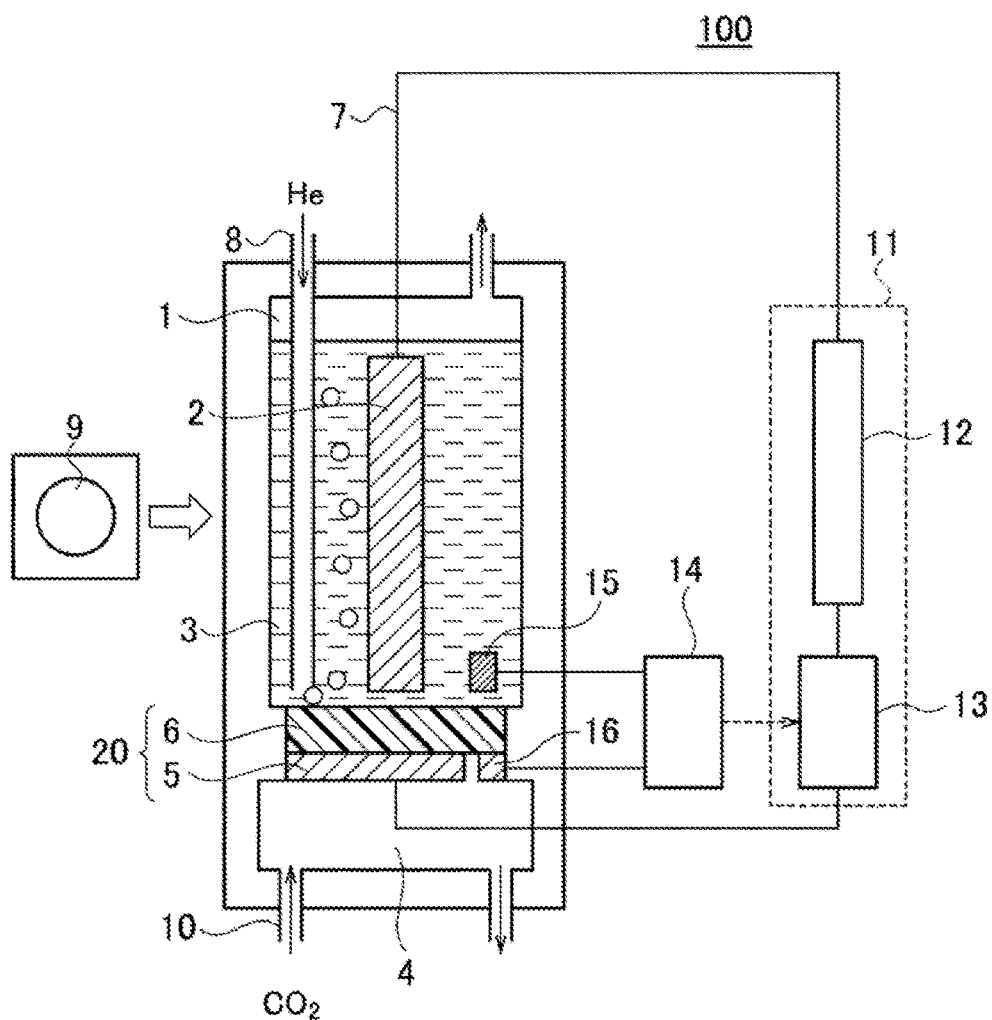
FIG. 1 is a diagram illustrating an example of a configuration of a gas phase reduction device for carbon dioxide according to the present embodiment.

A gas phase reduction device 100 for carbon dioxide according to the present embodiment will be described with reference to FIG. 1. The gas phase reduction device 100 illustrated in FIG. 1 is a gas phase reduction device for carbon dioxide that exerts a catalytic function by light irradiation to generate oxidation-reduction reaction.

The gas phase reduction device 100 includes an oxidation tank 1 and a reduction tank 4 formed by dividing an internal space in a housing into two by a porous electrode-supported electrolyte membrane 20.

The oxidation tank 1 is filled with an aqueous solution 3. A semiconductor photoelectrode 2 formed from a semiconductor or a metal complex is inserted into the aqueous solution 3.

The semiconductor photoelectrode 2 is, for example, a compound exhibiting photoactivity and redox activity, such as a nitride semiconductor, titanium oxide, amorphous silicon, a ruthenium complex, or a rhenium complex.

The aqueous solution 3 is, for example, a potassium hydrogen carbonate aqueous solution, a sodium hydrogen carbonate aqueous solution, a potassium chloride aqueous solution, a sodium chloride aqueous solution, a sodium hydroxide aqueous solution, a potassium hydroxide aqueous solution, a rubidium hydroxide aqueous solution, or a cesium hydroxide aqueous solution. During reduction reaction, helium gas is supplied from a tube 8 to the aqueous solution 3.

Carbon dioxide is supplied from a gas input port 10 to the reduction tank 4, and the reduction tank 4 is filled with carbon dioxide or gas containing carbon dioxide.

Figure 2:
FIG. 2 is a cross-sectional view illustrating an example of a configuration of a porous electrode-supported electrolyte membrane.
Figure 3:
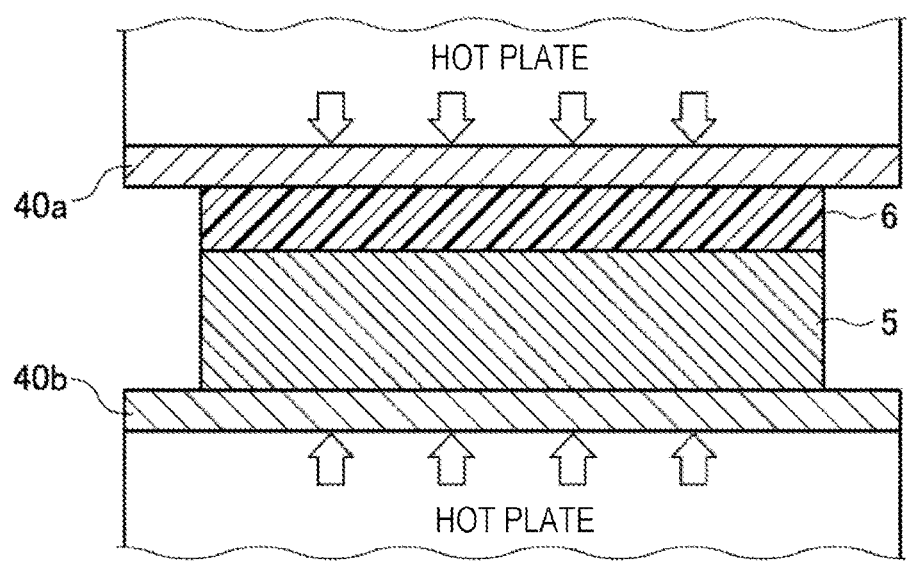
FIG. 3 is a diagram illustrating an example of a state in which thermocompression bonding is performed when a porous electrode-supported electrolyte membrane is manufactured.

As illustrated in FIG. 2, the porous electrode-supported electrolyte membrane 20 is a joint body in which an electrolyte membrane 6 and a porous reduction electrode 5 are joined. As illustrated in FIG. 3, the porous electrode-supported electrolyte membrane 20 can be produced by the porous reduction electrode 5 and the electrolyte membrane 6 being sandwiched in an overlapping manner between two copper plates 40a and 40b, and pressure being applied under a condition of a predetermined heating temperature by a thermocompression bonding device (hot plates). The porous electrode-supported electrolyte membrane 20 is installed with the electrolyte membrane 6 facing the oxidation tank 1 and the porous reduction electrode 5 facing the reduction tank 4.

The porous reduction electrode 5 is, for example, a porous body of copper, platinum, gold, silver, indium, palladium, gallium, nickel, tin, cadmium, or an alloy thereof, a porous body of silver oxide, copper oxide, copper (II) oxide, nickel oxide, indium oxide, tin oxide, tungsten oxide, tungsten oxide (VI), or copper oxide, or a porous metal complex including a metal ion and an anionic ligand.

The electrolyte membrane 6 is, for example, Nafion (registered trademark), FORBLUE, or Aquivion, which is an electrolyte membrane having a carbon-fluorine skeleton, or SELEMION or NEOSEPTA, which is an electrolyte membrane having a hydrocarbon skeleton.

A light source 9 is installed such that the semiconductor photoelectrode 2 is irradiated with light. The light source 9 is, for example, a xenon lamp, a pseudo sunlight source, a halogen lamp, a mercury lamp, or sunlight. The light source 9 may be formed by a combination thereof.

The semiconductor photoelectrode 2 is electrically connected to the porous reduction electrode 5 by a conducting wire 7. A control unit 11 is connected between the semiconductor photoelectrode 2 and the porous reduction electrode 5. The control unit 11 includes a solar cell 12 and a constant voltage power supply 13, and maintains electromotive force at an initial value at the start of reduction reaction.

The solar cell 12 is installed on the back surface of the semiconductor photoelectrode 2, that is, the solar cell 12 is installed at the tip of the straight line connecting the light source 9 and the semiconductor photoelectrode 2. By using a material having smaller band gap energy (larger absorption wavelength range) for the solar cell 12 than for the semiconductor photoelectrode 2, the semiconductor photoelectrode 2 can absorb light from the light source 9, and the solar cell 12 can absorb transmitted light. The solar cell 12 is, for example, a silicon (Si) based solar cell, a CIGS based solar cell, a group III-V based solar cell, a CdTe based solar cell, a dye-sensitized based solar cell, or an organic semiconductor based solar cell. Note that the control unit 11 may not include the solar cell 12.

Reference electrodes 15 and 16 are installed in the aqueous solution 3 in the oxidation tank 1 and on the porous reduction electrode 5 side of the electrolyte membrane 6. The reference electrode 15 is not in contact with the electrolyte membrane 6, and the reference electrode 16 is installed in contact with the electrolyte membrane 6. The reference electrode 16 and the porous reduction electrode 5 are insulated from each other. The reference electrodes 15 and 16 are, for example, metals of copper, platinum, and the like, normal hydrogen electrodes (NHE), or silver oxide silver electrodes (Ag/AgCl electrodes).

A voltmeter 14 is connected to the reference electrodes 15 and 16 to measure voltage between the reference electrodes 15 and 16. Change in voltage between the reference electrodes 15 and 16 measured by the voltmeter 14 corresponds to change in electromotive force due to pH change. The control unit 11 changes voltage at both ends of the solar cell 12 and the constant voltage power supply 13 so as to compensate for the change, and maintains the electromotive force between the semiconductor photoelectrode 2 and the porous reduction electrode 5 at an initial value at the start of reduction reaction. For example, a decrease in voltage measured by the voltmeter 14 is fed back to variable resistance of the constant voltage power supply 13, and the variable resistance is controlled, thereby a voltage value output from the constant voltage power supply 13 can be controlled.

[Gas Phase Reduction Method for Carbon Dioxide]

Figure 4:
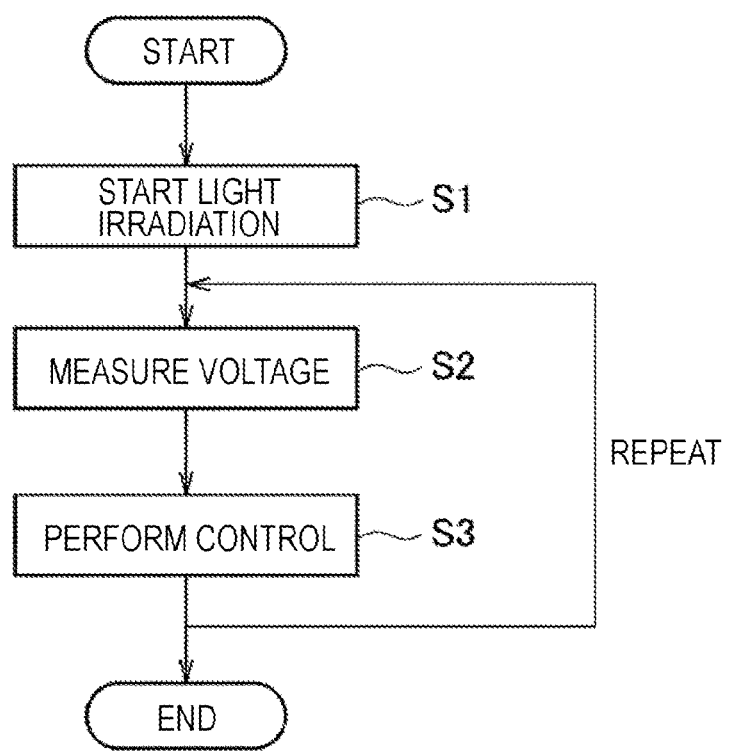
FIG. 4 is a flowchart illustrating an example of steps of a gas phase reduction method for carbon dioxide according to the present embodiment.

Next, a gas phase reduction method for carbon dioxide according to the present embodiment will be described with reference to a flowchart of FIG. 4.

In step S1, the light source 9 starts light irradiation to the semiconductor photoelectrode 2.

In step S2, the voltmeter 14 measures voltage between the reference electrodes 15 and 16 and transmits the voltage to the control unit 11. The control unit 11 stores an initial value of the voltage at the start of the light irradiation.

In step S3, the control unit 11 controls the constant voltage power supply 13 so as to compensate for change from the initial value of the voltage between the reference electrodes 15 and 16.

Steps S2 and S3 are repeatedly performed during the light irradiation, and electromotive force is maintained at the initial value at the start of reduction reaction.

[Example of Gas Phase Reduction Device]

A gas phase reduction test was performed on gas phase reduction devices 100 of Examples 1 to 3 using semiconductor photoelectrodes 2 having different absorption edge wavelengths. The gas phase reduction test was also performed on gas phase reduction devices of Comparative Examples 1 to 3 each in which voltage between the semiconductor photoelectrode 2 and the porous reduction electrode 5 was not maintained at an initial value. Hereinafter, the gas phase reduction devices 100 of Examples 1 to 3 and the gas phase reduction devices of Comparative Examples 1 to 3 will be described.

Example 1

As the semiconductor photoelectrode 2 of Example 1, a semiconductor photoelectrode was used in which epitaxial growth of GaN as an n-type semiconductor and epitaxial growth of AlGaN were performed in this order on a sapphire substrate, vacuum-depositing Ni was performed on the AlGaN, and heat-treating was performed on the resulting product to form a promotor thin film of NiO.

As the solar cell 12, a Si based solar cell manufactured by Sphelar Power Corporation (model name: KSP-OC-1830MR-ER-X03), which was a single cell and had open circuit voltage of 0.6 V, was used.

The semiconductor photoelectrode 2 has an absorption edge wavelength of 365 nm. Since the absorption edge wavelength of the solar cell 12 is 1130 nm, the semiconductor photoelectrode 2 absorbs light up to a wavelength of 365 nm out of light from the light source 9, and the solar cell 12 absorbs transmitted light up to a wavelength of 1130 nm.

The porous electrode-supported electrolyte membrane 20 was produced by using a copper porous body having a thickness of 0.2 mm and a porosity of 97% as a material of the porous reduction electrode 5, and using Nafion as a cation exchange membrane for the electrolyte membrane 6, applying pressure under the condition of a heating temperature of 150° C. by hot plates, leaving the porous electrode-supported electrolyte membrane 20 for three minutes, and quickly cooling and taking out the porous electrode-supported electrolyte membrane 20. The porous reduction electrode 5 after thermocompression bonding had a thickness of 0.14 mm and a porosity of 96%.

Example 2

As the semiconductor photoelectrode 2 of Example 2, a semiconductor photoelectrode was used in which epitaxial growth of GaN as an n-type semiconductor and epitaxial growth of InGaN were performed in this order on a sapphire substrate, vacuum-depositing Ni was performed on the InGaN, and heat-treating was performed on the resulting product to form a promotor thin film of NiO.

As the solar cell 12, a Si based solar cell manufactured by Sphelar Power Corporation, which had two series and open circuit voltage of 1.2 V, was used. A state in which 0.8 V was applied by the solar cell 12 and the constant voltage power supply 13 was set as an initial state of light irradiation, and electromotive force was controlled to be constant by the electromotive force being further boosted from 0.8 V for the decrease.

Since the absorption edge wavelength of the semiconductor photoelectrode 2 is 388 nm and the absorption edge wavelength of the solar cell 12 is 1130 nm, the semiconductor photoelectrode 2 absorbs light up to a wavelength of 388 nm out of light from the light source 9, and the solar cell 12 absorbs transmitted light up to a wavelength of 1130 nm.

Other conditions are similar to those in Example 1.

Example 3

As the semiconductor photoelectrode 2 of Example 3, a semiconductor photoelectrode was used in which epitaxial growth of GaN as an n-type semiconductor was performed on a sapphire substrate, a Ta film was formed on the GaN by sputtering and nitriding treatment to form a $Ta_3N_5$ thin film, vacuum-depositing Ni was performed on the $Ta_3N_5$ thin film, and heat-treating was performed on the resulting product to form a promotor thin film of NiO.

As the solar cell 12, a Si based solar cell manufactured by Sphelar Power Corporation, which had two series and open circuit voltage of 1.2 V, was used. A state in which 0.8 V was applied by the solar cell 12 and the constant voltage power supply 13 was set as an initial state of light irradiation, and electromotive force was controlled to be constant by the electromotive force being further boosted from 0.8 V for the decrease.

Since the absorption edge wavelength of the semiconductor photoelectrode 2 is 590 nm and the absorption edge wavelength of the solar cell 12 is 1130 nm, the semiconductor photoelectrode 2 absorbs light up to a wavelength of 590 nm out of light from the light source 9, and the solar cell 12 absorbs transmitted light up to a wavelength of 1130 nm.

Other conditions are similar to those in Example 1.

Comparative Example 1

The gas phase reduction device of Comparative Example 1 is different from the gas phase reduction device 100 of Example 1 in that the control unit 11 (the solar cell 12 and the constant voltage power supply 13), the voltmeter 14, and the reference electrodes 15 and 16 are not included. The semiconductor photoelectrode 2 is electrically connected to the porous reduction electrode 5 by the conducting wire 7. Other configurations are similar to those of Example 1.

Comparative Example 2

The gas phase reduction device of Comparative Example 2 is different from the gas phase reduction device 100 of Example 2 in that the voltmeter 14 and the reference electrodes 15 and 16 are not included. A decrease in voltage measured by the voltmeter 14 is not fed back to the control unit 11. Other configurations are similar to those of Example 2.

Comparative Example 3

The gas phase reduction device of Comparative Example 3 is different from the gas phase reduction device 100 of Example 3 in that the voltmeter 14 and the reference electrodes 15 and 16 are not included. A decrease in voltage measured by the voltmeter 14 is not fed back to the control unit 11. Other configurations are similar to those of Example 3.

[Electrochemical Measurement and Measurement of Gas/Liquid Generation Amount]

The following reduction reaction test was performed on the gas phase reduction devices 100 of Examples 1 to 3 and the gas phase reduction devices of Comparative Examples 1 to 3.

The oxidation tank 1 was filled with the aqueous solution 3. As the aqueous solution 3, a potassium hydroxide aqueous solution of 1.0 mol/L was used.

The semiconductor photoelectrode 2 of each of Examples 1 to 3 and Comparative Examples 1 to 3 was installed in the oxidation tank 1 so as to be immersed in the aqueous solution 3.

The light source 9, the semiconductor photoelectrode 2, and the solar cell 12 were arranged in the order illustrated in FIG. 1. Note that, in Comparative Example 1, the solar cell 12 is not installed.

As the light source 9, a high pressure xenon lamp of 300 W (that cuts wavelength of 450 nm or more, and has illuminance of 6.6 $mW/cm^2$) was used. The light source 9 was fixed such that a surface of the semiconductor photoelectrode 2 on which an oxidation co-catalyst was formed was an irradiation surface. A light irradiation area of the semiconductor photoelectrode 2 was set to 1.5 $cm^2$.

Platinum was used for the reference electrode 15. A copper thin film was used for the reference electrode 16, and the reference electrode 16 was formed by thermocompression bonding to the electrolyte membrane 6 in the same manner as the porous reduction electrode 5. Note that, in Comparative Examples 1 to 3, the reference electrodes 15 and 16 are not installed.

Helium (He) was caused to flow into the oxidation tank 1 from the tube 8, and carbon dioxide ($CO_2$) was caused to flow into the reduction tank 4 from the gas input port 10 at a flow rate of 5 ml/min and pressure of 0.18 MPa. In this system, reduction reaction of carbon dioxide can proceed at the three-phase interface constituted by [electrolyte membrane-copper-carbon dioxide in gas phase] in the porous electrode-supported electrolyte membrane 20.

After the oxidation tank 1 and the reduction tank 4 were sufficiently replaced with helium and carbon dioxide, the semiconductor photoelectrode 2 was uniformly irradiated with light using the light source 9 for 30 hours. By the light irradiation, electrons flow between the semiconductor photoelectrode 2 and the porous reduction electrode 5.

In Examples 1 to 3, a voltage value between the semiconductor photoelectrode 2 and the porous reduction electrode 5 was controlled to be maintained at an initial value at the start of the light irradiation. A linear control method is used in Examples 1 to 3, although the feedback control method is not limited thereto. Specifically, an initial set value of applied voltage of the constant voltage power supply 13 is V0. The voltmeter 14 measures the potential of the reference electrode 15 for the reference electrode 16 every 0.1 seconds and transfers the potential to a computer (not illustrated) of the control unit 11. The control unit 11 calculates change ΔV in potential from the initial stage to each measurement time, and controls the set value of the applied voltage of the constant voltage power supply 13 to V0−ΔV. In this manner, the control unit 11 performs control to compensate for a decrease in voltage using the solar cell 12 and the constant voltage power supply 13.

Note that, in Comparative Example 1, the voltage between the semiconductor photoelectrode 2 and the porous reduction electrode 5 is not controlled. In Comparative Examples 2 and 3, a state in which 0.8 V is applied by the solar cell 12 and the constant voltage power supply 13 is maintained, and the voltage value between the semiconductor photoelectrode 2 and the porous reduction electrode 5 is not maintained at the initial value at the start of light irradiation.

A current value between the semiconductor photoelectrode 2 and the porous reduction electrode 5 at the time of light irradiation was measured using an electrochemical measurement apparatus (Model 1287 Potentiogalvanostat manufactured by Solartron). Furthermore, gas and liquid in the oxidation tank 1 and the reduction tank 4 were collected at any time during the light irradiation, and reaction products were analyzed using a gas chromatograph, a liquid chromatograph, and a gas chromatograph mass spectrometer. As a result, it was confirmed that oxygen was generated in the oxidation tank 1, and hydrogen, carbon monoxide, formic acid, methane, methanol, ethanol, and ethylene were generated in the reduction tank 4.

[Evaluation of Examples and Comparative Examples]

Next, test results of Examples 1 to 3 and Comparative Examples 1 to 3 will be described. Table 1 indicates Faraday efficiency maintenance rates of carbon dioxide reduction reaction after 30 hours for Examples 1 to 3 and Comparative Examples 1 to 3.

TABLE 1

|  | Semiconductor photoelectrode material | Electromotive force control | Faraday efficiency maintenance rate of carbon dioxide reduction reaction after 30 hours (%) |
|---|---|---|---|
| Example 1 | NiO/AlGaN/n – GaN/sapphire | Yes | 85 |
| Example 2 | NiO/InGan/n – GaN/sapphire | Yes | 84 |
| Example 3 | NiO/Ta3N5/n – GaN/sapphire | Yes | 85 |
| Comparative Example 1 | NiO/AlGaN/n – GaN/sapphire | No | 54 |
| Comparative Example 2 | NiO/InGaN/n – GaN/sapphire | No | 55 |
| Comparative Example 3 | NiO/Ta3N5/n + GaN/sapphire | No | 53 |

As indicated in Formula (7), Faraday efficiency indicates a ratio of a current value used in reduction reaction to a current value flowing between electrodes at the time of light irradiation.

$$\text{Faraday efficiency [\%] of reduction reaction} = (\text{charge consumed in reduction reaction})/(\text{charge flowing between oxidation electrode and reduction electrode})*100 \quad (7)$$

Here, the "charge consumed in reduction reaction" in Formula (7) can be obtained by converting a measured value of a reaction product amount of reduction reaction into a charge necessary for the reduction reaction. In a case where the reaction product amount of reduction reaction was denoted by A [mol], the number of electrons required for the reduction reaction was denoted by Z, and a Faraday constant was denoted by F [C/mol], calculation was performed using Formula (8).

$$\text{Charge consumed in reduction reaction } [C] = A*Z*F \quad (8)$$

A faraday efficiency maintenance rate of reduction reaction after 30 hours was defined and calculated as following Formula (9).

$$\text{Faraday efficiency maintenance rate [\%] of reduction reaction after 30 hours} = (\text{Faraday efficiency of reduction reaction after 30 hours})/(\text{Faraday efficiency of reduction reaction after 1 hour})*100 \quad (9)$$

From Table 1, when Examples 1 to 3 and Comparative Examples 1 to 3 were compared, it was confirmed that Faraday efficiency maintenance rates of carbon dioxide reduction reaction after 30 hours in respective Examples were higher than those in Comparative Examples. This is considered to be because electromotive force of the semiconductor photoelectrode 2 and the porous reduction electrode 5 was able to be maintained at an initial value, and the efficiency of reduction reaction of carbon dioxide was able to be maintained in each of Examples. Furthermore, there is an advantage that light energy applied from the light source can be effectively utilized by voltage being increased using the solar cell in order to maintain the electromotive force between the electrodes.

As described above, a gas phase reduction device 100 for carbon dioxide according to the present embodiment includes an oxidation tank 1 in which an aqueous solution 3 is put, a reduction tank 4 to which carbon dioxide is supplied, a semiconductor photoelectrode 2 installed in the aqueous solution 3, and a porous electrode-supported electrolyte membrane 20 that is a joint body of an electrolyte membrane 6 and a porous reduction electrode 5, the porous electrode-supported electrolyte membrane 20 being installed between the oxidation tank 1 and the reduction tank 4 with the electrolyte membrane 6 facing the oxidation tank 1 and the porous reduction electrode 5 facing the reduction tank 4. Voltage between a reference electrode 15 installed in the aqueous solution 3 and a reference electrode 16 installed in contact with the electrolyte membrane 6 is measured by a voltmeter 14, and a control unit 11 increases voltage between the semiconductor photoelectrode 2 and the porous reduction electrode 5 in accordance with change in voltage between the reference electrodes 15 and 16 from an initial value at start of reaction. As a result, since a decrease in electromotive force between the semiconductor photoelectrode 2 and the porous reduction electrode 5 is compensated by pressure being increased by the control unit 11, a life of carbon dioxide reduction reaction can be improved.

The control unit 11 includes a solar cell 12 and a constant voltage power supply 13, and the solar cell 12 is arranged on an extension line of a straight line from a light source 9 toward the semiconductor photoelectrode 2, and generates power utilizing light emitted to and transmitted through the semiconductor photoelectrode 2. Thus, light energy applied from the light source 9 can be effectively utilized.

REFERENCE SIGNS LIST

100 Gas phase reduction device
1 Oxidation tank
2 Semiconductor photoelectrode
3 Aqueous solution
4 Reduction tank
5 Porous reduction electrode
6 Electrolyte membrane
7 Conducting wire
8 Tube
9 Light source
10 Gas input port
11 Control unit
12 Solar cell
13 Constant voltage power supply
14 Voltmeter
15, 16 Reference electrode
20 Porous electrode-supported electrolyte membrane

The invention claimed is:

1. A gas phase reduction device for carbon dioxide that exerts a catalytic function by light irradiation to generate oxidation-reduction reaction, the gas phase reduction device for carbon dioxide comprising:
an oxidation tank in which an aqueous solution is put;
a reduction tank to which carbon dioxide is supplied;
a semiconductor photoelectrode installed in an aqueous solution in the oxidation tank;
a porous electrode-supported electrolyte membrane that is a joint body of an electrolyte membrane and a porous reduction electrode, the porous electrode-supported electrolyte membrane being installed between the oxidation tank and the reduction tank with the electrolyte membrane facing the oxidation tank and the porous reduction electrode facing the reduction tank;
a control unit that is electrically connected to the semiconductor photoelectrode and the porous reduction electrode and controls voltage between the semiconductor photoelectrode and the porous reduction electrode;
a first reference electrode installed in an aqueous solution in the oxidation tank;
a second reference electrode installed on the reduction tank side in contact with the electrolyte membrane; and
a voltmeter that measures voltage between the first reference electrode and the second reference electrode,
wherein the control unit increases voltage between the semiconductor photoelectrode and the porous reduction electrode in accordance with change in voltage between the first reference electrode and the second reference electrode from an initial value at start of reaction.

2. The gas phase reduction device for carbon dioxide according to claim 1,
wherein the control unit includes a solar cell and a constant voltage power supply, and
the solar cell is arranged on an extension line of a straight line extending from a light source that irradiates the semiconductor photoelectrode with light toward the semiconductor photoelectrode, and generates power utilizing light that is emitted to and transmitted through the semiconductor photoelectrode.

3. The gas phase reduction device for carbon dioxide according to claim 2,
wherein a range of a wavelength that can be absorbed by the semiconductor photoelectrode is smaller than a range of a wavelength range that can be absorbed by the solar cell.

4. A gas phase reduction method for carbon dioxide using a gas phase reduction device for carbon dioxide including an oxidation tank in which an aqueous solution is put, a reduction tank to which carbon dioxide is supplied, a semiconductor photoelectrode installed in an aqueous solution in the oxidation tank, and a porous electrode-supported electrolyte membrane that is a joint body of an electrolyte membrane and a porous reduction electrode, the porous electrode-supported electrolyte membrane being installed between the oxidation tank and the reduction tank with the electrolyte membrane facing the oxidation tank and the porous reduction electrode facing the reduction tank, the gas phase reduction method for carbon dioxide comprising:
measuring voltage between a first reference electrode installed in an aqueous solution in the oxidation tank and a second reference electrode installed on the reduction tank side in contact with the electrolyte membrane; and
increasing voltage between the semiconductor photoelectrode and the porous reduction electrode in accordance with change in voltage between the first reference electrode and the second reference electrode from an initial value at start of reaction.

* * * * *